(12) United States Patent
Higuchi et al.

(10) Patent No.: US 9,977,322 B2
(45) Date of Patent: May 22, 2018

(54) FILM OR SHEET, AND SCREEN

(71) Applicant: ASAHI GLASS COMPANY, LIMITED, Chiyoda-ku (JP)

(72) Inventors: Yoshiaki Higuchi, Chiyoda-ku (JP); Seigo Kotera, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/708,889

(22) Filed: Sep. 19, 2017

(65) Prior Publication Data
US 2018/0004078 A1    Jan. 4, 2018

Related U.S. Application Data

(63) Continuation of application No. PCT/JP2016/067265, filed on Jun. 9, 2016.

(30) Foreign Application Priority Data

Jun. 12, 2015  (JP) ................. 2015-119518

(51) Int. Cl.
*G03B 21/62* (2014.01)
*C08J 5/18* (2006.01)

(52) U.S. Cl.
CPC ............. *G03B 21/62* (2013.01); *C08J 5/18* (2013.01); *C08J 2323/08* (2013.01); *C08J 2327/18* (2013.01)

(58) Field of Classification Search
CPC ..................................................... G03B 21/62
(Continued)

(56) References Cited

U.S. PATENT DOCUMENTS 4,431,720 A * 2/1984 Sugarman ............ G03B 21/625
                                                        359/453
6,556,347 B1    4/2003 Murayama et al.
(Continued)

FOREIGN PATENT DOCUMENTS

JP    2001-311806    11/2001
JP    2001-311807    11/2001
(Continued)

OTHER PUBLICATIONS

International Search Report dated Sep. 13, 2016 in PCT/JP2016/067265, filed on Jun. 9, 2016.

*Primary Examiner* — Christopher Mahoney
(74) *Attorney, Agent, or Firm* — Oblon, McClelland, Maier & Neustadt, L.L.P.

(57) ABSTRACT

To provide a film or sheet and a screen excellent in visibility of a projected image, in see-through properties when an image is not projected and in bending resistance. A single-layer film or sheet comprising a fluororesin, a light-scattering agent and a light absorbing agent, characterized in that the light-scattering agent is at least one light-scattering agent selected from the group consisting of a titanium oxide-containing pigment, a zinc oxide-containing pigment and a cerium oxide-containing pigment, and the content thereof is from 0.01 to 0.175 g/m$^2$, and the light absorbing agent is at least one light absorbing agent selected from the group consisting of carbon black, a black interference aluminum pigment, black iron oxide and titanium black, and the content thereof is from 0.0005 to 0.035 g/m$^2$.

14 Claims, 1 Drawing Sheet

(58) Field of Classification Search
USPC .................................................. 359/453, 460
See application file for complete search history.

(56) References Cited

U.S. PATENT DOCUMENTS

| | | | |
|---|---|---|---|
| 6,710,919 B1* | 3/2004 | Clausen | G03B 21/10 359/453 |
| 7,595,789 B2* | 9/2009 | Nakata | G03B 21/62 178/18.03 |
| 2003/0174396 A1 | 9/2003 | Murayama et al. | |
| 2009/0002817 A1* | 1/2009 | Harada | G02B 5/0242 359/453 |

FOREIGN PATENT DOCUMENTS

| | | |
|---|---|---|
| JP | 2002-6400 | 1/2002 |
| JP | 2002-6403 | 1/2002 |
| JP | 2005-99675 | 4/2005 |
| JP | 2006-227279 | 8/2006 |
| JP | 2006-243693 | 9/2006 |
| JP | 2013-182141 | 9/2013 |
| JP | 2014-197163 | 10/2014 |
| WO | WO 00/38005 A1 | 6/2000 |
| WO | WO 2016/068087 A1 | 5/2016 |

* cited by examiner

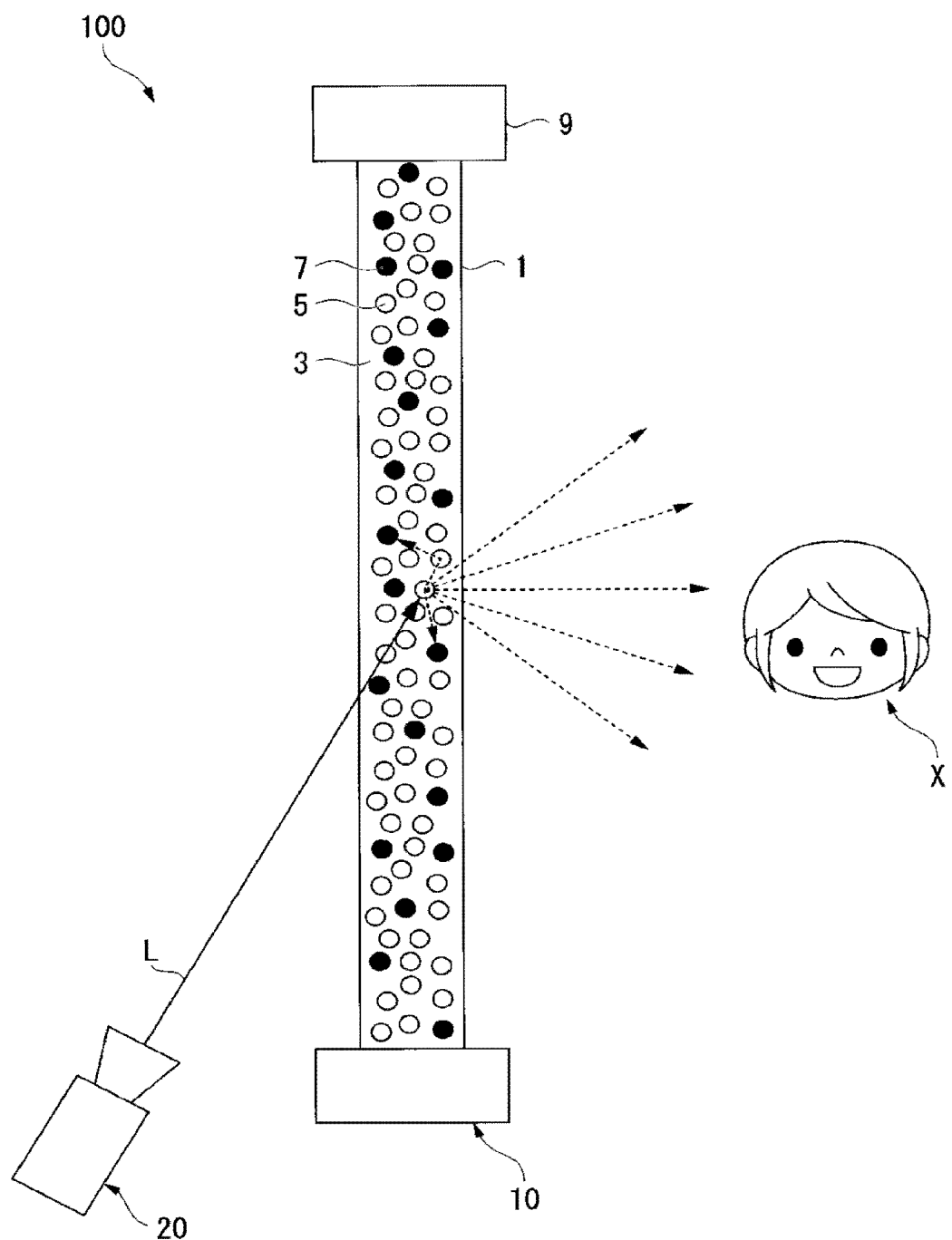

FILM OR SHEET, AND SCREEN

TECHNICAL FIELD

The present invention relates to a film or sheet and a screen.

BACKGROUND ART

As a screen for displaying an image projected from a projector, a reflection type wherein the image from the projector is projected from the viewer side (front side), or a transmission type wherein the image from the projector is projected from the side (back side) opposite to the viewer side, is known.

In a conventional screen in general, when the image was not projected, the viewer was unable to view the other side of the screen. For example, in a transmission type screen, usually irregularities are provided on the surface in order to display an image by scattering light projected from the back side, and although the light from the back side is transmitted, a haze was high and it was difficult for the observer to clearly visually recognize the state of the back side.

In recent years, see-through screens have been proposed whereby it is possible to view the other side of the screens when the image is not projected. For example, the following (1) to (3) have been proposed as screens having see-through properties improved while securing the visibility of the image.

(1) A see-through transmission type screen having a light diffusing layer on at least one side of a light transmissive support such as a polyethylene terephthalate (PET) film, wherein the light diffusion layer comprises light diffusing fine particles made of organic fine particles or inorganic fine particles and a xerogel (a gel having an internal solvent lost by evaporation to have a net-work structure with void spaces) (Patent Document 1).

(2) A semi-transmission type reflective screen which is a screen to reflect image light projected from an image source to let it be visible and which comprises unit prism shapes arranged in plurality in one-dimensional or two-dimensional directions along the screen surface, light-absorbing portions formed between said unit prism shapes and containing microbeads to absorb light, and a reflective transmission layer made of an aluminum-deposited PET film formed on at least the back surface side of the unit prism shapes, to reflect the image light that has passed through the unit prism shapes and to let light from the side opposite to the projection side where the image light is projected, be transmitted (Patent Document 2).

(3) A translucent projector screen containing a polarizing laminate comprising a diffusion-type polarizing layer and an absorption-type polarizing layer, wherein transmission axes of both layers are parallel, and wherein the diffusion-type polarizing layer comprises a continuous phase formed of a first transparent thermoplastic resin such as polycarbonate, and a dispersed phase formed of a second transparent thermoplastic resin such as a polyalkylene naphthalate resin and having a refractive index different from the continuous phase (Patent Document 3).

PRIOR ART DOCUMENTS

Patent Documents

Patent Document 1: JP-A-2013-182141
Patent Document 2: JP-A-2006-243693
Patent Document 3: JP-A-2014-197163

DISCLOSURE OF INVENTION

Technical Problem

However, according to the present inventors' finding, the screens of (1) to (3) have such a problem that the bending resistance is low. The bending resistance being low is undesirable from the viewpoint of handling efficiency of the screens.

For example, in the transmission type screen of (1), by using a xerogel as a binder, an air layer is introduced around the light-diffusing particles to maximize the light scattering efficiency. However, due to the presence of air bubbles around the particles, the strength is low, and the bending resistance is low.

In the screen of (2), the materials are different between the unit prism shapes and the light absorbing portions, and therefore, their adhesion at the interface is low, and when bent, the unit prism shapes and the light-absorbing portions are likely to be separated, whereby the structure will be broken, and the functions will be impaired.

In the screen of (3), the continuous phase and the dispersed phase in the diffusion type polarizing layer are not in a completely compatible system, and therefore, when bent, the structure is likely to be broken, and the functions will be impaired.

It is an object of the present invention is to provide a film or sheet and a screen which are excellent in visibility of a projected image, in see-through properties when an image is not projected and in bending resistance.

Solution to Problem

The present invention provides a film or sheet, a laminate and a screen having the following constructions [1] to [14].
[1] A film or sheet which is a single layer film or sheet comprising a fluororesin, a light scattering agent and a light absorbing agent, and which is characterized in that the light-scattering agent is at least one light-scattering agent selected from the group consisting of a titanium oxide-containing pigment, a zinc oxide-containing pigment and a cerium oxide-containing pigment, and the content thereof is from 0.01 to 0.175 g/m$^2$, and the light absorbing agent is at least one light absorbing agent selected from the group consisting of carbon black, a black interference aluminum pigment, black iron oxide and titanium black, and the content thereof is from 0.0005 to 0.035 g/m$^2$.
[2] The film or sheet according to [1], wherein the titanium oxide-containing pigment is a composite having part or all of the surface of titanium oxide particles coated with at least one of coating materials selected from the group consisting of silicon oxide, aluminum oxide, talc, zirconium oxide, calcium carbonate, barium sulfate, aluminum hydroxide, magnesium hydroxide, boehmite, phosphate glass, silica-based low-melting-point glass and magnesium oxide, the zinc oxide-containing pigment is a composite having part or all of the surface of zinc oxide particles coated with at least one of said coating materials, and the cerium oxide-containing pigment is a composite having part or all of the surface of cerium oxide particles coated with at least one of said coating materials.
[3] The film or sheet according to [2], wherein in each of the titanium oxide-containing pigment, the zinc oxide-containing pigment and the cerium oxide-containing pigment, the coating material is silicon oxide, and in each of the titanium oxide particles, the zinc oxide particles and the cerium oxide particles, the proportion of the silicon oxide is from 1 to 99 mass % to the total of the particles and the silicon oxide.

[4] The film or sheet according to any one of [1] to [3], which contains, as the light scattering agent, the titanium oxide-containing pigment and the zinc oxide-containing pigment.

[5] The film or sheet according to [4], wherein the content of the titanium oxide-containing pigment to the total amount of the titanium oxide-containing pigment and the zinc oxide-containing pigment, is from 30 to 95 mass %.

[6] The film or sheet according to any one of [1] to [5], wherein the mass ratio of the light scattering agent to the light absorbing agent represented by light scattering agent/light absorbing agent is at least 2.

[7] The film or sheet according to any one of [1] to [6], wherein the fluororesin is a fluororesin selected from the group consisting of an ethylene-tetrafluoroethylene copolymer, polyvinylidene fluoride, polyvinyl fluoride, a tetrafluoroethylene-perfluoro(alkyl vinyl ether) copolymer, a tetrafluoroethylene-perfluoro(methyl vinyl ether)-perfluoro(propyl vinyl ether) copolymer, a tetrafluoroethylene-hexafluoropropylene copolymer, an ethylene-chlorotrifluoroethylene copolymer and polychlorotrifluoroethylene.

[8] The film or sheet according to any one of [1] to [6], wherein the fluororesin is an ethylene-tetrafluoroethylene copolymer.

[9] The film or sheet according to any one of [1] to [8], which has a thickness of from 25 to 2,000 μm.

[10] The film or sheet according to any one of [1] to [9], which has a total light transmittance of from 65 to 80%.

[11] The film or sheet according to any one of [1] to [10], which has a haze of from 10 to 30%.

[12] A laminate which comprises at least one layer of the film or sheet as defined in any one of [1] to [11] and at least one layer of a single layer film or sheet containing a fluororesin and a light absorbing agent and not containing a light scattering agent, and which has a total light transmittance of from 65 to 80% and a haze of from 10 to 30%.

[13] A screen comprising the film or sheet as defined in any one of [1] to [11].

[14] A screen comprising the laminate as defined in [12].

Advantageous Effects of Invention

The film or sheet of the present invention is excellent in visibility of a projected image, in see-through properties when an image is not projected, and in bending resistance.

The screen of the present invention is excellent in visibility of a projected image, in see-through properties when an image is not projected, and in bending resistance.

BRIEF DESCRIPTION OF THE DRAWING

FIG. 1 is a block diagram schematically showing an example of an image display system comprising the screen of the present invention.

DESCRIPTION OF EMBODIMENTS

In this specification, the meanings of the following terms are as follows.

A "film" is a membrane-like formed product having a thickness of at most 500 μm, and a "sheet" is a membrane-like molded product having a thickness exceeding 500 μm. A film or sheet may collectively be referred to as a "film or the like".

An "average particle size" is a value measured by a laser light scattering method.

A "haze" is a value measured in accordance with JIS K7136: 2000.

A "total light transmittance" is a value measured in accordance with JIS K7375: 2008.

[Film or the Like]

The film or the like of the present invention comprises a fluororesin, a light scattering agent and a light absorbing agent and is a single layer.

Each of the light scattering agent and the light absorbing agent is dispersed in the fluororesin.

The film or the like may further contain, as the case requires, component(s) other than the fluororesin, the light scattering agent and the light absorbing agent, within a range not to impair the effects of the present invention. For example, although a matrix of a film or the like is usually a fluororesin, the matrix of a film or the like of the present invention may be a blend resin of a fluororesin and another resin. It is preferred that the matrix of a film or the like of the present invention contains a fluororesin as the main component. The "main component" indicates that the proportion of the fluororesin based on the total amount of the matrix is at least 50 mass %. The proportion of the fluororesin based on the total amount of the matrix is preferably from 80 to 100 mass %.

(Fluororesin)

The fluororesin may be one which is transparent and is preferably a fluororesin, of which the total light transmittance would be at least 80% when the fluororesin is formed into a film or the like made solely of the fluororesin, having the same thickness as the film or the like.

Specific examples of the fluororesin include, for example, an ethylene-tetrafluoroethylene copolymer (hereinafter referred to also as "ETFE"), polyvinylidene fluoride, polyvinyl fluoride, a tetrafluoroethylene-perfluoro(alkyl vinyl ether) copolymer, a tetrafluoroethylene-perfluoro(methyl vinyl ether)-perfluoro(propyl vinyl ether) copolymer, a tetrafluoroethylene-hexafluoropropylene copolymer, an ethylene-chlorotrifluoroethylene copolymer and polychlorotrifluoroethylene. From the viewpoint of excellent balance of mechanical strength and light resistance, ETFE is preferred. Of ETFE, the melt flow rate (hereinafter referred to also as "MFR") measured under the conditions of 297° C. and 49 N in accordance with ASTM D-3159, is preferably from 0.1 to 600 g/10 min, more preferably from 0.1 to 100 g/10 min from the viewpoint of excellent mechanical strength, particularly preferably from 0.1 to 50 g/10 min from the viewpoint of excellent formability at the time of melt molding.

As the fluororesin, one type may be used alone, or two or more types may be used in combination.

(Light Scattering Agent)

The light scattering agent contained in the film or the like of the present invention is at least one light scattering agent selected from the group consisting of a titanium oxide-containing pigment, a zinc oxide-containing pigment and a cerium oxide-containing pigment.

Since the film or the like contains a light scattering agent, it is possible to let light entered in the film or the like be scattered and to make a projected image visible.

The film or the like of the present invention preferably contains both titanium oxide-containing pigment and zinc oxide-containing pigment.

Titanium oxide is relatively strong in photoactivity and may cause whitening of the fluororesin as time passes. On the other hand, zinc oxide is weak in photoactivity, but is low in water resistance, whereby there is a risk of elution from the film or the like with water.

Further, zinc oxide has a UV absorbing property, while titanium oxide has no UV absorbing property.

When a titanium oxide-containing pigment and a zinc oxide-containing pigment are used in combination, due to the UV absorbing property of the zinc oxide pigment, the photoactivity of titanium oxide pigment is suppressed, whereby whitening of the fluororesin will be suppressed. Further, the titanium oxide-containing particles are superior to the zinc oxide-containing pigment in water resistance, and the light scattering effect is also strong, whereby even if elution of the zinc oxide-containing pigment is caused, the light scattering effect will be maintained to a certain degree.

In the case of using the titanium oxide-containing pigment and the zinc oxide-containing pigment in combination, the proportion of the titanium oxide-containing pigment to the total amount of the titanium oxide-containing pigment and the zinc oxide-containing pigment, is preferably from 30 to 95 mass %, particularly preferably from 40 to 90 mass %.

The titanium oxide-containing pigment may be titanium oxide particles. From the viewpoint of more excellent weather resistance, the titanium oxide-containing pigment is preferably a composite (hereinafter referred to also as "composite (T)") having part or all of the surface of titanium oxide particles coated with at least one of coating materials selected from the group consisting of silicon oxide, aluminum oxide, talc, zirconium oxide, calcium carbonate, barium sulfate, aluminum hydroxide, magnesium hydroxide, boehmite, phosphate glass, silica-based low-melting-point glass and magnesium oxide.

The zinc oxide-containing pigment may be zinc oxide particles, and from the viewpoint of more excellent weather resistance, may be a composite (hereinafter referred to also as "composite (Z)") having part or all of the surface of zinc oxide particles coated with at least one of said coating materials.

The cerium oxide-containing pigment may be cerium oxide particles and from the viewpoint of more excellent weather resistance, may be a composite (hereinafter referred to also as "composite (C)") having part or all of the surface of cerium oxide particles coated with at least one of said coating materials.

As the coating material, silicon oxide is particularly preferred.

These composites (T), (Z) and (C) may, respectively, have another layer (e.g. an aluminum oxide layer, a zirconium oxide layer or the like) between the coating by the coating material and the particles.

In a case where the covering material in each of the composite (T), the composite (Z) and the composite (C) is silicon oxide, the proportion of silicon oxide (hereinafter referred to also as "$SiO_2$ coating amount") to the total of the particles and the silicon oxide in each of the titanium oxide particles, the zinc oxide particles and the cerium oxide particles, is preferably from 1 to 99 mass %, particularly preferably from 1 to 85 mass %. When the $SiO_2$ coating amount is at least the lower limit value within the above range, a sufficient photo-inactivation effect can be obtained. When the $SiO_2$ coating amount is at most the upper limit value in the above range, the light scattering properties of the film will be excellent. The above preferred range of the $SiO_2$ coating amount is applicable to each of the composite (T), the composite (Z) and the composite (C).

The method for coating the particles may, for example, be a method of surface-treating the particles with a hydrolytically condensable silane compound, or a method of forming a single layer or multiple layer coating film on the surface of the particles, by an inorganic oxide such as silicon oxide, aluminum oxide, zirconium oxide, etc.

Such coating can be carried out by a known method. For example, as a coating method for silicon oxide, a method utilizing a sol-gel reaction using a tetraalkoxysilane, or a method of forming the coating from water glass (e.g. JP-A-11-256133), may for example, be mentioned. Otherwise, commercially available one may be used.

The average particle size of the light scattering agent is preferably from 0.01 to 0.5 μm, particularly preferably from 0.01 to 0.1 μm.

When the average particle size of the light scattering agent is at the same level or slightly smaller than the wavelength of light to be scattered, the probability increases that light is scattered in a direction perpendicular to the surface of the film or the like, and the function to scatter incident light without refracting it becomes stronger. As a result, distortion of the scene visible at the other side of the film or the like as viewed from the observer side is less likely to be caused, and a rapid change in light intensity is less likely to occur, whereby see-through properties will be improved. When the average particle size of the light scattering agent is within the above range, the effect of improving see-through properties can be sufficiently exhibited.

(Light Absorbing Agent)

The light absorbing agent contained in the film or the like of the present invention is at least one light absorbing agent selected from the group consisting of carbon black, a black interference aluminum pigment, black iron oxide and titanium black.

Each of carbon black, a black interference aluminum pigment, black iron oxide and titanium black is a black pigment and is capable of absorbing light homogeneously over the entire light wavelength.

When light enters in a film containing a light scattering agent, the light is reflected many times at the surface of the light scattering agent and the film, to form stray light. If stray light is formed by an image light projected, by the light propagating in the film, the image projected portion looks whitish, whereby the contrast will be lowered, and the visibility of the image will be lowered. Even when an image is not projected, if stray light is formed by external light, the see-through properties will decrease. As a light absorbing agent is contained, a part of the light propagating as stray light inside of the film will be absorbed, and stray light will be suppressed. Therefore, the visibility of the image or the see-through properties will be improved. Further, since external light entered in the film or the like will be absorbed by the light absorbing agent, it is possible to suppress whitening of the fluororesin to some extent.

As carbon black, one having an average particle size of from about 3 to 500 nm is commonly used, and, for example, acetylene black, furnace black, channel black, lamp black, etc. may be mentioned. Among them, acetylene black is preferred, from such a viewpoint that the surface area is relatively small and dispersibility in the fluororesin is excellent.

The acetylene black may, for example, be Denka Black (registered trademark) manufactured by Denki Kagaku Kogyo Kabushiki Kaisha, or Ace black manufactured by Soltex, Inc.

A black interference aluminum pigment is an aluminum pigment exhibiting black color by interference of light. A black interference aluminum pigment is usually composed of aluminum flakes as a base material, having a half mirror structure comprising a silica layer and a silver particle layer on the surface, and further having a protective silica layer thereon. Such a black interference aluminum pigment is commercially available from Toyo Aluminum K.K., etc.

Black iron oxide is black-colored iron oxide which also exists in nature and which is referred to also as magnetite and is represented by $Fe_3O_4$ or $FeO_4Fe_2O_3$. Such black iron oxide is commercially available from Ozeki Co., Ltd., etc.

Titanium black is a titanium-based black pigment and is commercially available from Mitsubishi Materials Electronic Chemicals Co., Ltd., etc.

As the light absorbing agent, carbon black is preferred, since it is readily homogeneously dispersible in the fluororesin.

(Content of Each Component)

In the film or the like of the present invention, the content of the light scattering agent is, by mass per unit area of the film or the like, from 0.01 to 0.175 $g/m^2$, particularly preferably from 0.0175 to 0.11 $g/m^2$. When the content of the light scattering agent is at least the lower limit value in the above range, visibility of a projected image will be excellent. When the content of the light scattering agent is at most the upper limit value in the above range, the haze of the film or the like will be low, the see-through properties when an image is not projected, will be excellent.

The content of the light absorbing agent is, by mass per unit area of the film or the like, from 0.0005 to 0.035 $g/m^2$, particularly preferably from 0.0035 to 0.035 $g/m^2$. When the content of the light absorbing agent is at least the lower limit value in the above range, a decrease in image contrast due to stray light will be sufficiently suppressed, and the visibility of the image will be excellent. When the content of the light absorbing agent is at most the upper limit value in the above range, the transparency of the film or the like will be high, and the see-through properties when an image is not projected, will be excellent.

The mass ratio of the light scattering agent to the light absorbing agent represented by light scattering agent/light absorbing agent, is preferably at least 2, more preferably from 2 to 100, further preferably from 2 to 30, particularly preferably from 2 to 25. When the mass ratio of light scattering agent/light absorbing agent is at least the above lower limit value, projection properties will be more excellent. When the mass ratio of light scattering agent/light absorbing agent is at most the above upper limit value, the see-through properties will be more excellent.

The total content of the fluororesin, the light scattering agent and the light absorbing agent is, based on the total mass of the film or the like, preferably at least 90 mass %, particularly preferably at least 95 mass %. The upper limit is not particularly limited and may be 100 mass %.

(Thickness)

The thickness of the film or the like is preferably from 25 to 2,000 μm, more preferably from 50 to 1,000 μm, particularly preferably from 150 to 800 μm. When the thickness of the film or the like is at least the lower limit value in the above range, the projection properties of the film or the like will be more excellent. When the thickness of the film or the like is at most the upper limit value in the above range, the see-through properties of the film or the like will be more excellent, and it tends to be easy to produce the film or the like.

(Haze)

The haze of the film or the like is preferably from 10 to 30%, particularly preferably from 10 to 20%. When the haze is at least the lower limit value in the above range, the visibility of a projected image will be excellent. When the haze is at most the upper limit value in the above range, the see-through properties when an image is not projected will be excellent.

The haze of the film or the like can be adjusted by e.g. the respective contents of the light scattering agent and the light absorbing agent.

(Total Light Transmittance)

The total light transmittance of the film or the like is preferably from 65 to 80%, particularly preferably from 70 to 80%. When the total light transmittance is at least the lower limit value in the above range, the see-through properties when an image is not projected, will be excellent. When the total light transmittance is at most the upper limit value in the above range, the visibility of a projected image will be excellent.

The total light transmittance of the film or the like can be adjusted by e.g. the respective contents of the light scattering agent and the light absorbing agent, the thickness of the film or the like, etc.

(Method for Producing Film or the Like)

The film or the like can be produced by a known method as a method for producing a fluororesin film or the like. For example, the film or the like can be produced by the following methods.

(1) A method of melt-kneading a fluororesin, a light scattering agent and a light absorbing agent to form a resin composition, and molding the resin composition into a film or sheet by a known molding method.

(2) A method of melt-kneading a part of a fluororesin, a light scattering agent and a light absorbing agent to form a master batch, then melt-kneading said master batch and the rest of the fluororesin to form a resin composition, and molding the resin composition into a film or sheet by a known molding method.

(3) A method of melt-kneading a part of a fluororesin and a light scattering agent to form a first master batch, melt-kneading a part of the fluororesin and a light absorbing agent to form a second master batch, then melt-kneading the first master batch, the second master batch and the rest of the fluororesin to form a resin composition, and molding the resin composition into a film or sheet by a known molding method.

In the methods (1) to (3), after kneading at the time of obtaining the resin composition, the obtained resin composition may be pelletized, and the obtained pellets may be molded, or the resin composition may be molded directly without pelletizing it.

As a method for producing the film or the like, the method of (2) or (3) is preferred. The contents of the light scattering agent and the light absorbing agent in the film or the like are small, and therefore, in the method of (1), it takes time to uniformly disperse the light scattering agent and the light absorbing agent in the fluororesin. In the method of (2) or (3), the light scattering agent and the light absorbing agent are kneaded at relatively high concentrations, and then, diluted with the fluororesin, whereby it is easy to uniformly disperse the light scattering agent and the light absorbing agent in the fluororesin.

(Advantageous Effects)

The film or the like of the present invention is excellent in visibility of a projected image, in see-through properties when an image is not projected, and in bending resistance.

Particularly, the content of each of the light scattering agent and the light absorbing agent is kept below the above upper limit value, whereby the haze is made low, and the transparency (total light transmittance) is made high. Therefore, the see-through properties are excellent, and through the film or the like, it is possible to see the other side of the film or the like when an image is not projected. Further, as the light absorbing agent is contained together with the light scattering agent, stray light is suppressed.

Further, the film or the like of the present invention is excellent also in weather resistance, since it contains a fluororesin and a light-absorbing agent. Therefore, even when the film or the like is used outdoors as a screen, it is possible to prevent degradation of the performance over a long period of time.

Further, in the transmission type screen of (1) mentioned in the background art, a xerogel is used as a binder, and air bubbles are present around the particles, whereby it is not possible to provide the necessary strength as a screen by the light diffusing layer alone, and for the purpose of reinforcement a light transmissive support such as a polyethylene terephthalate film is required. In contrast, in the film or the like of the present invention, an air layer is not formed around the light scattering agent and the light absorbing agent, and the film or the like has sufficient strength even in a single layer.

[Laminate]

A film or the like for a screen may be a laminate comprising at least one layer of the above-described film or the like of the present invention and at least one layer of another film or the like.

Another film or the like to be laminated with the film or the like of the present invention is preferably a film or the like (hereinafter referred to also as a "film or the like (X)") containing a fluororesin and a light absorbing agent and not containing a light scattering agent, or a film or the like (hereinafter referred to also as a "film or the like (Y)") containing a fluororesin and not containing a light scattering agent and a light absorbing agent. The light absorbing agent or the light scattering agent in such a film or the like (X) or (Y), may be of the same type as the above-described light absorbing agent or the above described light scattering agent in the film or the like in the present invention, or may be of another type, but is preferably of the same type as the above-described light absorbing agent or the above-described light scattering agent.

By laminating the film or the like of the present invention with a film or the like (X) or a film or the like (Y), it is possible to increase the strength of the screen. Particularly in the case of a film or the like (X) containing a light absorbing agent, it is possible to suppress incidence of light entering in the film or the like of the present invention laminated on the side of the film or the like (X) opposite to the incident side of light such as sunlight, whereby the weather resistance will be better.

The total light transmittance and haze of the laminate are preferably in the same ranges as of the film or the like of the present invention as described above.

Exemplary and preferred embodiments of the light absorbing agent in the film or the like (X) are the same as in the film or the like of the present invention, respectively. The content of the light absorbing agent in the film or the like (X) is preferably from 0.0005 to 0.035 g/m$^2$, and the more preferred range is the same as in the film or the like of the present invention. The content of the light scattering agent in the film or the like (Y) is also the same as in the film or the like of the present invention.

Exemplary and preferred embodiments of the fluororesin in the film or the like (X) or the film or the like (Y) are the same as in the film or the like of the present invention, respectively. The fluororesin in each of the film or the like (X) and the film or the like (Y) may be the same as or different from the fluororesin in the film or the like of the present invention, and is, from the viewpoint of excellent adhesion between the layers, preferably the same.

The thickness of the film or the like (X) or the film or the like (Y), is preferably from 50 to 2,000 µm, and the more preferred range is the same as of the film or the like of the present invention. The thickness of the film or the like (X) or the film or the like (Y), may be the same as or different from the film or the like of the present invention.

As the laminate having the film or the like of the present invention and another film or the like laminated, preferred is a laminate of two to five layer-structure comprising one or two sheets of the film or the like of the present invention and one or two sheets of another film or the like, and more preferred is a laminate of two or three-layer structure. The laminate of two or three-layer structure may, for example, be one having any layer structure of the following (1) to (6).

(1) Two-layer structure of a film or the like of the present invention/a film or the like (X).

(2) Three-layer structure of a film or the like of the present invention/a film or the like (X)/a film or the like of the present invention.

(3) Three-layer structure of a film or the like (X)/a film or the like of the present invention/a film or the like (X).

(4) Two-layer structure of a film or the like of the present invention/a film or the like (Y).

(5) Three-layer structure of a film or the like of the present invention/a film or the like (Y)/a film or the like of the present invention.

(6) Three-layer structure of a film or the like (Y)/a film or the like of the present invention/a film or the like (Y).

Among the above, three-layer structures of (2), (3), (5) and (6) are preferred, and three-layer structures of (2) and (3) are particularly preferred.

[Screen]

The screen of the present invention comprises the above-described film or the like, or the above-described laminate, of the present invention.

The screen of the present invention may be made of the film or the like, or the laminate, of the present invention, or may further comprise, in addition to the film or the like or the laminate of the present invention, another member.

An example of the screen comprising the film or the like of the present invention and another member may be a panel-like screen having such a structure that the periphery of the film or the like or the laminate of the present invention, is supported by a frame.

The screen of the present invention may, for example, be installed alone at an optional place outdoors or indoors, or may constitute a film-structure building. The film-structure building is a building having at least part of a roof, wall, etc. constituted by a film material, and may, for example, be a sports facility, a greenhouse, an atrium, etc.

FIG. 1 is a block diagram schematically showing an example of an image display apparatus having a screen of the present invention. The image display apparatus 100 in FIG. 1 comprises a screen 10 and a projector 20.

The screen 10 is a panel-shaped screen having such a structure that the periphery of the film or the like 1 is supported by a frame 9.

The film or the like 1 is a film or the like of the present invention and is a single layer film or the like comprising a fluororesin 3, a light scattering agent 5 and a light absorbing agent 7.

The projector 20 is disposed on the rear side of the screen 10 as spaced apart from the screen 10, so as to observe the image from the front side of the screen. That is, in this example, the screen 10 is used as a transmission type screen for projecting an image from the rear side of the screen.

Here, the front side of the screen 10 is the side of a viewer X to observe the image projected on the screen 10, and the rear side is the opposite side to the side of the viewer X.

The projector 20 is one to project image light L on the film 1 of the screen 10.

As the projector 20, a known projector may be used, and a CRT (Cathode Ray Tube) projector, a liquid crystal projector, a DLP (Digital Light Processing) projector, a LCOS (Liquid Crystal On Silicon) projector, or a GLV (Grating Light Valve) projector may, for example, be mentioned.

In the image display apparatus 100, as shown in FIG. 1, when image light L is projected from the projector 20 to the film 1 of the screen 10, the image light L entered in the film 1 is scattered by the light scattering agent 5 to form an image, which is displayed visibly as an image to the observer X on the other side of the projector 20. A part of the scattered light is absorbed by the light absorbing agent 7, whereby stray light is suppressed.

When image light L is not projected from the projector 20, the status on the other side of the screen 10 can be seen through.

Here, an example of using the screen 10 as a transmission type screen has been shown, but the present invention is not limited thereto. For example, the screen 10 may be used as a reflective screen for projecting an image from the front side of the screen and viewing the image from the front side of the screen.

Instead of the film or the like 1 in the screen 10, a laminate having the film or the like of the present invention and another film or the like laminated, may be used.

(Applications)

Applications of the screen of the present invention are not particularly limited.

For example, as applications in construction of buildings, etc., the following applications may be mentioned.

Display of images for the interior of living space, for commercial (CM) or for education.
Display of advertisements by a method of projecting them from inside of a building.
Display of information, advertisements, etc. at a car dealer.
Advertisements or movies on show windows of buildings, changes of exterior design properties, in particular, displays at window tops. •Use as a glass door of a supermarket, retail or public building for displaying an advertisement, information notification, event, etc. •Display of growth information, etc. as a structural material in a greenhouse. •Use as a glass wall, where a pattern of wallpaper can be changed. •A back board of e.g. a stadium, studio, etc. •Partition of a bathroom in e.g. a hotel. •Use as a privacy screen switchable for projecting or non-projecting a suitable image or light; in particular, in conference rooms, hospitals, banks, restaurants, in public facilities, at the time of non-projection of light, the other side can be seen through clearly, and thus, it is possible to improve the security at the time of guarding when a privacy filter is not in use. •Display of characters, signs, pictures or videos at airports, train stations, hospitals or schools. •Display of information of local areas and sight-seeing spots at religious facilities such as temples, shrines, churches, etc. •Space projection at commercial facilities. •Projection mapping. •Display of characters, signs, pictures, videos, etc. at a stadium. •Use for projecting information at a kitchen or an image for a personal use. •Whiteboard. •To be used as e.g. a writing board or display board at schools or meeting rooms. •Further, to be used together with a user interface. •To be used as a thermal insulation multi-layer glass for a refrigerator door in supermarkets or convenience stores.

As applications for table tops, casings, etc., the following applications may be mentioned.

Table top at a restaurant.
Counter at a sushi restaurant.
Desk (desktop), or kitchen counter.
Partition for tabletop.
Underground showcase at a department store.
Boutique showcase, or changing room.
Vending machine.
Partition at a pachinko shop.
Front glass of a pachinko machine. When pachinko is being played, it is transparent, and therefore, you can enjoy the game as it is. When the machine is vacant without a player, an advertisement of the shop may be displayed on the front glass of the machine.

As applications in vehicles, the following applications may be mentioned.

In railway vehicles,
Window glass at the back side of a driver (to prevent reflection of the interior lighting at the time of underground operation).
Display of information on a side window glass of a train.
Hanging of an advertisement.
Partition portions of a super express train.
Window glass of a linear motor car.
To impart a screen function to a window for an electric train. Particularly when utilized e.g. after the sunset, visibility may rise well.
In automobiles, etc.,
Display at a shade portion of a front glass.
Display of information at a lower portion of a front glass for automobiles.
Display of information or an image on an interior partition of a taxi, a limousine, etc. or an interior advertisement in a bus (backside of the driver). •Automotive sun visor. •Display of images of TV or DVD as an interior partition in a minivan or a sport utility vehicle (SUV). •Method of use to display e.g. "Be Careful" on a door glass when a side door is opened. •Mounted on the rear glass to display backlight, high-mounted stop lamp (HMSL), to display information on the rear side, to display destination of a bus. •Periphery of a meter. •Screen for a door glass.

As one utilizing a diffusing function of reflected light or transmitted light, an antiglare glass or a glare-proof mirror may be mentioned.

As another special application, a cover glass for traffic lights (integration of various signal displays) may be mentioned.

EXAMPLES

In the following, the present invention will be described in detail with reference to Examples. However, the present invention is not limited by the following description.

Among the following Ex. 1 to 32, Ex. 1 to 19 are Examples of the present invention, and Ex. 20 to 32 are Comparative Examples.

The evaluation methods and materials used in each Example are shown below.

[Evaluation Methods]

(Thickness)

The thickness (μm) of a film or the like was measured by a contact type micrometer (MDE-50 MJ, manufactured by Mitutoyo Corporation).

(Total Light Transmittance)

The total light transmittance (%) of a film or the like was measured in accordance with JIS K7375: 2008.

(Haze)

The haze (%) of the film or the like was measured in accordance with JIS K7136: 2000.

(Image Visibility and See-Through Properties)

The ends of a film or the like of 15 cm×15 cm were fixed to the upper and lower sides of a rectangular aluminum frame, which was then let to stand upright. Then, as shown in FIG. 1, a general-purpose projector (EB935W, manufactured by Epson) was installed on the rear side of the film or the like, and an image was projected on the film or the like from the projector. To what extent the projected image can be visually recognized, was visually observed from the front side of the film or the like, whereby the image visibility was judged by the following standards. Further, when an image is not projected, to what extent the status (transmitted image) on the back side of the film or the like can be visually recognized from the front side of the film or the like, was visually observed, whereby the see-through properties were judged by the following standards.

<Judging Standards for Image Visibility>

⊚ (excellent): The image was clearly visible and was excellent in color development of the color image.

○ (good): The image was visually recognized, but the color development of the color image was slightly weak.

x (bad): The image was visually recognized, but the image was whitish and was inferior in the image visibility.

xx (unacceptable): No image was seen.

<Judging Standards for See-Through Properties>

⊚ (excellent): The transmitted image was clearly visually recognized.

○ (good): The transmitted image was visually recognized, but it was slightly hazed.

Δ (acceptable): The transmitted image was visually recognized, but the haze was strong and the image was blurred.

x (bad): No transmitted image was visually recognized.

(Bending Resistance)

With respect to a film or the like of 15 cm×15 cm, a bending test was carried out by the following procedure.

At room temperature, the film or the like was folded back at 180 degrees so that one side of the film or the like being inside, then folded back at 180 degrees so that the other side of the film or the like being inside and returned to the original state.

After the bending test, the appearance of the film or the like was visually observed and the bending resistance was judged by the following standards.

<Judging Standards for Bending Resistance>

○ (good): No change was observed in appearance of the film or the like as between before and after the bending test.

x (bad): A change in appearance (such as breakage of the scattering layer) of the film or the like was observed by the test.

(Weather Resistance)

With respect to a film or the like of 15 cm×15 cm, an accelerated test was carried out by using the Eye Super UV tester manufactured by Iwasaki Electric Co., Ltd. The operating conditions of the Eye Super UV tester were as follows.

Irradiation intensity: 100 mW/cm$^2$ (wavelength: 300 to 450 nm).

Operating conditions: A 12 hours 20 seconds cycle of irradiation only for 10 hours (black panel temperature: 63° C., relative humidity: 50%)→water shower for 10 seconds→dark condensation for 2 hours (black panel temperature: 30° C., relative humidity: 100%)→water shower for 10 seconds, was repeated, and upon expiration of 500 hours from the start of operation, the operation was terminated.

Here, the irradiation was carried out perpendicular to one side of the film or the like.

The change in appearance of the film or the like as between before and after the accelerated test was judged by the following standards, to evaluate weather resistance.

<Judging Standards for Weather Resistance>

○ (good): No change in appearance of the film or the like was observed as between before and after the accelerated test.

Δ (acceptable): The film or the like was slightly whitened by the accelerated test.

x (bad): The film or the like was whitened by the accelerated test.

(Water Resistance)

With respect to a film or the like of 15 cm×15 cm, a high-temperature high-hum humidity test was carried out by placing the film or the like under conditions of 85° C. and RH of 85% for 1,000 hours.

After the high-temperature high-humidity test, the visibility was evaluated by the above-mentioned procedure, and from the results, the water resistance was judged by the following standards. Reduction of the visibility in this evaluation is considered to be due to elution of zinc oxide.

<Judging Standards for Water Resistance>

○ (good): No change was observed in image visibility as between before and after the high-temperature and high-humidity test.

x (bad): Image visibility was reduced by the high-temperature high-humidity test.

[Materials Used]

ETFE-1: Powder obtained by finely pulverizing Fluon (registered trademark) ETFE C-88AXB manufactured by Asahi Glass Company, Limited by a mechanical mill and processing it to an average particle size of 20 μm.

ETFE-2: Fluon (registered trademark) ETFE C-55AXP manufactured by Asahi Glass Company, Limited. Pellets.

Light scattering agent-1: $SiO_2$-coated $TiO_2$ particles, R-960 manufactured by DuPont, average particle size: 0.5 μm, $SiO_2$ coating amount: 5.6 mass % based on the total of $TiO_2$ particles and $SiO_2$.

Light scattering agent-2: $SiO_2$-coated ZnO particles, NANOFINE (registered trademark) 50 manufactured by Sakai Chemical Industry Co., Ltd., average particle size: 20 μm, $SiO_2$ coating amount: 63 mass % based on the total of ZnO particles and $SiO_2$.

Light scattering agent-3: $SiO_2$-coated $CeO_2$ particles, CERIGUARD (registered trademark) SC-6832 manufactured by Daito Kasei Kogyo Co., Ltd., average particle size: 8.5 μm, $SiO_2$ coating amount: 82.9 mass % based on the total of $CeO_2$ particles and $SiO_2$.

Light scattering agent-4: $TiO_2$ particles (uncoated), CR-58-2 manufactured by Ishihara Sangyo Kaisha, Ltd., average particle size: 0.3 μm.

Light scattering agent-5: ZnO particles (uncoated), Finex30 manufactured by Sakai Chemical Industry Co., Ltd., average particle size: 0.035 μm.

Light scattering agent-6: $CeO_2$ particles (uncoated), CERIGUARD (registered trademark) W-500 manufactured by Daito Kasei Kogyo Co., Ltd., average particle size: 2.9 μm.

$SiO_2$ particles: Aerosil (registered trademark) 8200 manufactured by Nippon Aerosil Co., Ltd., average particle size: 21 nm.

Light absorbing agent-1: acetylene black, Denka Black (registered trademark) manufactured by Denki Kagaku Kogyo Kabushiki Kaisha, average particle size: 25 nm.

Ex. 1 to 15 and 17 to 29

ETFE-1, and a light scattering agent or $SiO_2$ particles, were dry-blended at a mass ratio of 100:1 and then melt-kneaded by using a biaxial extruder ($\varphi$: 15 mm, L/D=45) manufactured by TECHNOVEL CORPORATION set at 320° C., to obtain master batch pellets MB-1.

Further, ETFE-1 and the light absorbing agent were dry-blended at a mass ratio of 100:0.5 and then melt-kneaded by using a biaxial extruder ($\varphi$: 15 mm, L/D=45) manufactured by TECHNOVEL CORPORATION set at 320° C., to obtain master batch pellets MB-2.

Then, the pellets of ETFE-2, MB-1 and MB-2 were dry-blended at a predetermined ratio, and then melt-kneaded by using a biaxial extruder ($\varphi$: 15 mm, L/D=45) manufactured by TECHNOVEL CORPORATION set at 320° C., to obtain raw material pellets.

Then, on a single-screw extruder having a diameter of 30 mm (a screw with L/D=22 and a compression ratio of 3.0 is mounted), a T-die for forming a film with a width of 150 mm was mounted, and heated to 300° C. The raw material pellets were charged into the single screw extruder and molded while adjusting the extrusion rate and the take-off speed so as to bring the thickness to be as shown in Tables 1 to 4 by using a constant-speed take-off device. The obtained film or the like was cut into 15 cm×15 cm for evaluation.

"$\varphi$" indicates the cylinder bore. "L/D" represents a value obtained by dividing the screw length L (m) by the screw diameter D (m). A "compression ratio" is a characteristic value of the screw configuration which is calculated from the ratio in the groove depth of the screw material feed portion and the screw metering portion. A "predetermined ratio" at the time of preparing the raw material pellets is a value where the respective contents ($g/m^2$) of the light scattering agent and the light absorbing agent in the obtainable film or the like would be the amounts shown in Tables 1 to 4.

Ex. 16

Film 16-1 was obtained by carrying out the same operation as in Ex. 1 except that the ratio of the dry blend of pellets of ETFE-2, MB-1 and MB-2 was changed.

Pellets of ETFE-2 and MB-2 were dry blended in a predetermined ratio and melt-kneaded by using a biaxial extruder ($\varphi$: 15 mm, L/D=45) manufactured by TECHNOVEL CORPORATION set at 320° C., to prepare raw-material pellets. The raw material pellets were molded in the same manner as in Ex. 1 to obtain film 16-2.

Films 16-1 and 16-2 were cut into 15 cm×15 cm. Then, the cut films 16-1 and 16-2 were stacked in the order of film 16-1/film 16-2/film 16-1, and pressed at 300° C. under 25 MPa (gauge pressure) for 5 minutes by a heating-type platen press (Mini test press manufactured by Toyo Seiki Seisaku-Sho, Ltd.). Then, the laminate was cooled as it is to obtain film 16-3 (three-layer laminated film).

Among the obtained three types of films 16-1 to 16-3, one corresponding to the film of the present invention is 16-1, which is denoted as the film in Ex. 16.

Ex. 30 to 32

In Ex. 30, a film (transmission screen) was obtained in accordance with the procedure in Example 1 of JP-A-2013-182141. Specifically, on one surface of a transparent PET film having a thickness of 100 μm, a light diffusing layer-coating liquid containing silica, polyvinyl alcohol, etc. was applied and dried to form a light diffusing layer thereby to obtain a film.

In Ex. 31, a film was obtained in accordance with the procedure in Example 1 of JP-A-2006-243693. Specifically, an ionizing radiation curable resin was applied on a base portion, and irradiated with ionizing radiation in a state of abutting a mold for curing to form unit prism shapes, followed by wiping to fill an ultraviolet curable resin between the unit prism shapes, and ultraviolet radiation was irradiated to cure it to form a light absorbing portion, on which a half mirror was laminated to obtain a film. As the base portion, a PET film having a thickness of 100 μm was used; as the ionizing radiation-curable resin for the unit prism shapes, SANRAD (registered trademark) B manufactured by Sanyo Chemical Industries, Ltd. was used; as the ultraviolet-curable resin for the light absorbing portion, one having 0.01 mass % of carbon black RCF #10 manufactured by Mitsubishi Chemical Corporation added to SANRAD C manufactured by Sanyo Chemical Industries, Ltd., was used, and as the half mirror, a half mirror foil (product with a reflectance of 40%) manufactured by Washin Chemical Industry Co., Ltd. was used.

In Ex. 32, a sheet (polarizing laminate) was obtained in accordance with the procedure in Example 6 of JP-A-2014-197163. Specifically, 5 parts by mass of a polyethylene naphthalate resin and 95 parts by mass of a polycarbonate resin were melt-kneaded, pelletized and press-molded to obtain a sheet having a thickness of 650 μm, which was stretched 3.0 times, and the obtained stretched film and an absorptive polarizing plate were laminated via an OCA adhesive sheet in such a state that the transmission axes of the two were in parallel, to obtain a polarizing laminate.

The contents ($g/m^2$) of the light scattering agent and the light absorbing agent in the film or the like obtained in each Ex., the light scattering agent/light absorbing agent (mass ratio) and the evaluation results of the total light transmittance, haze, image visibility, see-through properties, bending resistance, weather resistance and water resistance of the film or the like obtained in each Ex. are shown in Tables 1 to 4.

However, in an Ex. wherein at least one of results of image visibility, see-through properties and bending resistance, was x or xx, no evaluation of weather resistance and water resistance was carried out.

TABLE 1

| Ex. | 1 | 2 | 3 | 4 | 5 | 6 | 7 | 8 | 9 |
|---|---|---|---|---|---|---|---|---|---|
| Thickness of film or the like (μm) | 87.5 | 437.5 | 875 | 1,750 | 87.5 | 437.5 | 875 | 437.5 | 437.5 |
| Light scattering agent-2 (g/m$^2$) | 0.09625 | 0.09625 | 0.09625 | 0.09625 | 0.02188 | 0.02188 | 0.02188 | 0.09625 | 0.02188 |
| Light absorbing agent-1 (g/m$^2$) | 0.01925 | 0.01925 | 0.01925 | 0.01925 | 0.01094 | 0.01094 | 0.01094 | 0.005469 | 0.005469 |
| Light scattering agent/light absorbing agent | 5 | 5 | 5 | 5 | 2 | 2 | 2 | 17.6 | 4 |
| Total light transmittance (%) | 65.2 | 65.2 | 65.2 | 65.2 | 73.3 | 73.3 | 73.3 | 78.7 | 78.7 |
| Haze (%) | 29.7 | 29.7 | 29.7 | 29.7 | 11.9 | 11.9 | 11.9 | 29.7 | 11.9 |
| Image visibility | ◎ | ◎ | ◎ | ◎ | ○ | ○ | ○ | ◎ | ○ |
| See-through properties | ○ | ○ | ○ | ○ | ○ | ○ | ○ | ◎ | ◎ |
| Bending resistance | ○ | ○ | ○ | ○ | ○ | ○ | ○ | ○ | ○ |
| Weather resistance | ○ | ○ | ○ | ○ | ○ | ○ | ○ | ○ | ○ |
| Water resistance | X | X | X | X | X | X | X | X | X |

TABLE 2

| | Ex. | | | | | | | 16 | |
|---|---|---|---|---|---|---|---|---|---|
| | 10 | 11 | 12 | 13 | 14 | 15 | 16-1 | 16-2 | 16-3 |
| Thickness of film or the like (μm) | 437.5 | 437.5 | 437.5 | 437.5 | 437.5 | 437.5 | 87.5 | 262.5 | Three layer laminate of 16-1/ 16-2/ 16-1 |
| Light scattering agent-1 (g/m$^2$) | — | — | — | — | 0.08370 | 0.04813 | — | — | |
| Light scattering agent-2 (g/m$^2$) | 0.09625 | 0.04375 | 0.09625 | — | — | 0.04813 | 0.04813 | — | |
| Light scattering agent-3 (g/m$^2$) | — | — | — | 0.1059 | — | — | — | — | |
| Light absorbing agent-1 (g/m$^2$) | 0.004375 | 0.004375 | 0.01925 | 0.01925 | 0.01925 | 0.01925 | 0.01925 | 0.01925 | |
| Light scattering agent/light absorbing agent | 22 | 10 | 5 | 5.5 | 4.3 | 5 | 2.5 | — | — |
| Total light transmittance (%) | 79.7 | 79.7 | 65.2 | 65.2 | 65.2 | 65.0 | 73.0 | 84.0 | 66.0 |
| Haze (%) | 29.7 | 17.1 | 29.7 | 29.1 | 29.4 | 31.0 | 9.6 | 14.2 | 33.4 |
| Image visibility | ◎ | ○ | ◎ | ◎ | ◎ | ◎ | ○ | ○ | ○ |
| See-through properties | ◎ | ◎ | ○ | ○ | ○ | ○ | ○ | ○ | ○ |
| Bending resistance | ○ | ○ | ○ | ○ | ○ | ○ | ○ | — | ○ |
| Weather resistance | ○ | ○ | ○ | ○ | Δ | ○ | ○ | — | ○ |
| Water resistance | X | X | X | X | ○ | ○ | X | — | X |

TABLE 3

| Ex. | 17 | 18 | 19 | 20 | 21 | 22 | 23 | 24 |
|---|---|---|---|---|---|---|---|---|
| Thickness of film or the like (μm) | 437.5 | 437.5 | 437.5 | 437.5 | 437.5 | 437.5 | 437.5 | 175 |
| Light scattering agent-2 (g/m$^2$) | — | — | — | — | 0.09625 | 0.00875 | 0.021875 | 0.035 |
| Light scattering agent-4 (g/m$^2$) | 0.09625 | — | — | — | — | — | — | — |
| Light scattering agent-5 (g/m$^2$) | — | 0.09625 | — | — | — | — | — | — |
| Light scattering agent-6 (g/m$^2$) | — | — | 0.1059 | — | — | — | — | — |
| SiO2 particles (g/m$^2$) | — | — | — | 0.1154 | — | — | — | — |
| Light absorbing agent-1 (g/m$^2$) | 0.01925 | 0.01925 | 0.01925 | 0.01925 | 0.0004375 | 0.0004375 | 0.00004375 | 0.0000175 |
| Light scattering agent/light absorbing agent | 5 | 5 | 5.5 | 6 | 220 | 20 | 500 | 2,000 |
| Total light transmittance (%) | 65.2 | 65.2 | 65.2 | 65.2 | 84.0 | 84.0 | 84.0 | 84.0 |
| Haze (%) | 32.7 | 29.7 | 29.1 | 29.8 | 29.7 | 8.7 | 11.9 | 15.0 |
| Image visibility | ○ | ○ | ○ | ○ | X | XX | X | X |
| See-through properties | ○ | ○ | ○ | ○ | ◎ | ◎ | ◎ | ◎ |
| Bending resistance | ○ | ○ | ○ | ○ | ○ | ○ | ○ | ○ |
| Weather resistance | X | X | X | ○ | — | — | — | — |

TABLE 4

| Ex. | 25 | 26 | 27 | 28 | 29 | 30 | 31 | 32 |
|---|---|---|---|---|---|---|---|---|
| Thickness of film or the like (μm) | 437.5 | 437.5 | 175 | 437.5 | 437.5 | Example 1 of JP-A- 2013- 182141 | Example 1 of JP-A- 2006- 243693 | Example 6 of JP-A- 2014- 197163 |
| Light scattering agent-2 (g/m$^2$) | 0.004375 | 0.1810 | 0.0000175 | 0.004375 | 0.04375 | | | |
| Light absorbing agent-1 (g/m$^2$) | 0.01925 | 0.01925 | 0.003850 | 0.04375 | 0.04375 | | | |
| Light scattering agent/light absorbing agent | 0.23 | 9.4 | 0.005 | 0.10 | 1 | | | |

TABLE 4-continued

| Ex. | 25 | 26 | 27 | 28 | 29 | 30 | 31 | 32 |
|---|---|---|---|---|---|---|---|---|
| Total light transmittance (%) | 65.2 | 65.2 | 80.2 | 41.4 | 41.4 | — | — | Maximum transmittance in Example: 63.4% |
| Haze (%) | 7.7 | 50.0 | 6.6 | 7.7 | 17.1 | <50 | — | Minimum haze of transmission axis: 23 |
| Image visibility | XX | ○ | XX | XX | ○ | ◎ | ◎ | ◎ |
| See-through properties | ○ | X | ◎ | X | X | ○ | Δ | X |
| Bending resistance | ○ | ○ | ○ | ○ | ○ | X | X | X |

The film or the like in each of Ex. 1 to 19 was excellent in image visibility, see-through properties and bending resistance. In particular, the film or the like in each of Ex. 1 to 16 wherein a light scattering agent having the entire surface of particles coated with $SiO_2$ was used, was excellent also in weather resistance. The film in Ex. 15 wherein as the light scattering agent, a titanium oxide-containing pigment and a zinc oxide-containing pigment were used in combination, was excellent in water resistance as compared with the film in Ex. 1 wherein the zinc oxide-containing pigment was used alone, and was excellent in weather resistance as compared with the film in Ex. 14 wherein the titanium oxide pigment was used alone.

Also film (16-3) having film (16-1) in Ex. 16 and another film (16-2) laminated, was excellent in image visibility, see-through properties and bending resistance.

On the other hand, the film in Ex. 20 wherein $SiO_2$ particles were used instead of the light scattering agent, was inferior in image visibility with an image being thin.

The film in each of Ex. 21, 23 and 24 wherein the content of the light absorbing agent was less than 0.0005 g/m², was inferior in image visibility with an image being whitish and being low in contrast.

In the case of the film in Ex. 22 wherein the content of the light absorbing agent was less than 0.0005 g/m² and the content of the light scattering agent was less than 0.01 g/m², no image was projected on the film.

In the case of the film in each of Ex. 25 and 27 wherein the content of the light scattering agent was less than 0.01 g/m², no image was projected on the film.

The film in Ex. 26 wherein the content of a light-scattering agent exceeded 0.175 g/m², was inferior in see-through properties with the haze being high.

In the case of the film in Ex. 28 wherein the content of the light scattering agent was less than 0.01 g/m² and the content of the light absorbing agent exceeded 0.035 g/m², no image was projected on the film. Further, the film was strongly colored so that the total light transmittance was low, and was inferior in see-through properties whereby when an image was not projected, no transmission image was seen.

The film in Ex. 29 wherein the content of the light absorbing agent exceeded 0.035 g/m², was strongly colored so that the total light transmittance was low, and was inferior in see-through properties, whereby when an image was not projected, no transmission image was seen.

The film in Ex. 30 was inferior in bending resistance, whereby the light scattering layer was broken by the bending test. Also, the image was whitish due to the influence of an air layer, and it could not be said to be excellent in see-through properties.

The film in Ex. 31 was inferior in bending resistance, whereby the light scattering layer was broken by the bending test. Further, when an image was not projected, a transmission image was visible, but due to the influence of the prism, the image was not smooth.

The sheet in Ex. 32 was inferior in bending resistance, whereby the light scattering layer was broken by the bending test. Further, the size of the dispersed phase was large, and although the polarized light was transmitted, the image itself was not necessarily transmitted, whereby the image visibility was significantly low.

This application is a continuation of PCT Application No. PCT/JP2016/067265, filed on Jun. 9, 2016, which is based upon and claims the benefit of priority from Japanese Patent Application No. 2015-119518 filed on Jun. 12, 2015. The contents of those applications are incorporated herein by reference in their entireties.

REFERENCE SYMBOLS

1: film or the like, 3: fluororesin, 5: light scattering agent, 7: light absorbing agent, 9: frame, 10: screen, 20: projector, 100: image display device

What is claimed is:

1. A film or sheet which is a single layer film or sheet comprising a fluororesin, a light scattering agent and a light absorbing agent, and which is characterized in that
   the light-scattering agent is at least one light-scattering agent selected from the group consisting of a titanium oxide-containing pigment, a zinc oxide-containing pigment and a cerium oxide-containing pigment, and the content thereof is from 0.01 to 0.175 g/m², and
   the light absorbing agent is at least one light absorbing agent selected from the group consisting of carbon black, a black interference aluminum pigment, black iron oxide and titanium black, and the content thereof is from 0.0005 to 0.035 g/m².

2. The film or sheet according to claim 1, wherein the titanium oxide-containing pigment is a composite having part or all of the surface of titanium oxide particles coated with at least one of coating materials selected from the group consisting of silicon oxide, aluminum oxide, talc, zirconium oxide, calcium carbonate, barium sulfate, aluminum hydroxide, magnesium hydroxide, boehmite, phosphate glass, silica-based low-melting-point glass and magnesium oxide, the zinc oxide-containing pigment is a composite having part or all of the surface of zinc oxide particles coated with at least one of said coating materials, and the cerium oxide-containing pigment is a composite having part or all of the surface of cerium oxide particles coated with at least one of said coating materials.

3. The film or sheet according to claim 2, wherein in each of the titanium oxide-containing pigment, the zinc oxide-containing pigment and the cerium oxide-containing pigment, the coating material is silicon oxide, and in each of the titanium oxide particles, the zinc oxide particles and the cerium oxide particles, the proportion of the silicon oxide is from 1 to 99 mass % to the total of the particles and the silicon oxide.

4. The film or sheet according to claim 1, which contains, as the light scattering agent, the titanium oxide-containing pigment and the zinc oxide-containing pigment.

5. The film or sheet according to claim 4, wherein the content of the titanium oxide-containing pigment to the total amount of the titanium oxide-containing pigment and the zinc oxide-containing pigment, is from 30 to 95 mass %.

6. The film or sheet according to claim 1, wherein the mass ratio of the light scattering agent to the light absorbing agent represented by light scattering agent/light absorbing agent is at least 2.

7. The film or sheet according to claim 1, wherein the fluororesin is a fluororesin selected from the group consisting of an ethylene-tetrafluoroethylene copolymer, polyvinylidene fluoride, polyvinyl fluoride, a tetrafluoroethylene-perfluoro(alkyl vinyl ether) copolymer, a tetrafluoroethylene-perfluoro(methyl vinyl ether)-perfluoro (propyl vinyl ether) copolymer, a tetrafluoroethylene-hexafluoropropylene copolymer, an ethylene-chlorotrifluoroethylene copolymer and polychlorotrifluoroethylene.

8. The film or sheet according to claim 1, wherein the fluororesin is an ethylene-tetrafluoroethylene copolymer.

9. The film or sheet according to claim 1, which has a thickness of from 25 to 2,000 μm.

10. The film or sheet according to claim 1, which has a total light transmittance of from 65 to 80%.

11. The film or sheet according to claim 1, which has a haze of from 10 to 30%.

12. A laminate which comprises at least one layer of the film or sheet as defined in claim 1 and at least one layer of a single layer film or sheet containing a fluororesin and a light absorbing agent and not containing a light scattering agent, and which has a total light transmittance of from 65 to 80% and a haze of from 10 to 30%.

13. A screen comprising the film or sheet as defined in claim 1.

14. A screen comprising the laminate as defined in claim 12.

* * * * *